US012756185B2

(12) United States Patent
Abe et al.

(10) Patent No.: US 12,756,185 B2
(45) Date of Patent: Oct. 6, 2026

(54) POWER CONVERTER AND CONTROL METHOD OF POWER CONVERTER

(71) Applicant: FURUKAWA ELECTRIC CO., LTD., Tokyo (JP)

(72) Inventors: Asuka Abe, Tokyo (JP); Masahiro Rikiso, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 519 days.

(21) Appl. No.: 18/328,863

(22) Filed: Jun. 5, 2023

(65) Prior Publication Data

US 2023/0327434 A1 Oct. 12, 2023

Related U.S. Application Data

(63) Continuation of application No. PCT/JP2021/039992, filed on Oct. 29, 2021.

(30) Foreign Application Priority Data

Dec. 17, 2020 (JP) ................................ 2020-208921

(51) Int. Cl.
*H02J 1/102* (2026.01)
*H02J 3/38* (2026.01)

(52) U.S. Cl.
CPC .............. *H02J 1/102* (2013.01); *H02J 3/381* (2013.01)

(58) Field of Classification Search
CPC .. H02J 1/102; H02J 3/381; H02J 3/003; H02J 3/004; H02J 3/32; H02J 13/00006; H02J 2300/24; H02J 1/106; H02M 1/0025
See application file for complete search history.

(56) References Cited

U.S. PATENT DOCUMENTS

2017/0110880 A1 4/2017 Chen et al.
2019/0181648 A1* 6/2019 Zhou .................... G05B 19/042
(Continued)

FOREIGN PATENT DOCUMENTS

JP 2017-212785 A 11/2017
JP 2018-29408 A 2/2018
(Continued)

OTHER PUBLICATIONS

International Search Report issued Dec. 14, 2021 in PCT/JP2021/039992, filed on Oct. 29, 2021, 2 pages.

*Primary Examiner* — Thomas K Pham
(74) *Attorney, Agent, or Firm* — Oblon, McClelland, Maier & Neustadt, L.L.P.

(57) ABSTRACT

A power converter includes: a power converting unit configured to convert input power and output the converted power; and a control unit configured to control a power conversion characteristic of the power converting unit based on a reference function having a droop characteristic that is defined according to an input value, according to the input value in any one of voltage control, power control, and current control corresponding to the droop characteristic. The reference function is constituted of a plurality of droop functions having droop characteristics different from one another connected at a connection point. A control area to define a range of voltage, power, and current in which corresponding voltage control, power control, or current control is performed is acquired for each of the droop functions.

14 Claims, 7 Drawing Sheets

(56) References Cited

U.S. PATENT DOCUMENTS

| | | | |
|---|---|---|---|
| 2020/0280183 | A1 | 9/2020 | Yamashita et al. |
| 2020/0313565 | A1 * | 10/2020 | Mohamed Sayed Ahmed ............ H02M 7/125 |

FOREIGN PATENT DOCUMENTS

| | | | | | |
|---|---|---|---|---|---|
| JP | 6371603 | B2 | | 8/2018 | |
| JP | 2020-22331 | A | | 2/2020 | |
| WO | WO-2012000548 | A1 | * | 1/2012 | ................ H02J 1/12 |
| WO | WO-2014198292 | A1 | * | 12/2014 | ............ H02J 7/0068 |
| WO | WO 2019/103059 | A1 | | 5/2019 | |

* cited by examiner

POWER CONVERTER AND CONTROL METHOD OF POWER CONVERTER

This application is a continuation of International Application No. PCT/JP2021/039992, filed on Oct. 29, 2021 which claims the benefit of priority of the prior Japanese Patent Applications No. 2020-208921, filed on Dec. 17, 2020, the entire contents of which are incorporated herein by reference.

BACKGROUND

The present disclosure relates to a power converter, a power system, and a control method of a power converter.

As an alternate means of a large scale of an electric power network that is dependent on fossil energies and nuclear energy, a power grid that uses a locally produced and consumed electricity has attracted attention. To the power grid that uses a locally produced and consumed electricity, a wide variety of devices, such as a photovoltaic unit (PV) that is power generating equipment generating power by using renewable energy, a stationary battery storage, and an electric vehicle (EV) are connected. Because the respective devices described above are direct-current (DC) powered devices, construction of a power grid in direct current (DC grid) has been being studied.

As a control method of the DC grid, there is a method of centrally controlling a power supply to a DC bus of the DC grid by performing constant current control and constant voltage control for the respective devices described above based on an instruction of a central control unit by an electric power converter connected to the respective devices described above. While the centralized control method described above may control the entire DC grid easily, there has been a problem that it is difficult to smoothly deal with a sharp change in supply and demand of electricity. Moreover, in the centralized control method described above, there has been a possibility of voltage oscillation of the DC bus and the like as the voltage control becomes unstable particularly when the constant voltage control is performed at multiple positions over a wide area. Furthermore, there has been a problem, in the constant voltage control at multiple positions, that load sharing among the respective devices is impossible, that is, the respective devices may not supply power at a constant voltage to the DC bus in a coordinated manner according to power supply capacities of the respective devices.

Therefore, control of the DC grid by assigning a reference function based on a local power (P) and a local voltage (V) to each power converter to cause it to control autonomously and decentrally has been practiced (Japanese Patent No. 6371603, WO2019/103059 and JP-A-2018-029408). When implementing droop characteristics on a target voltage based on an amount of power necessary for the DC bus, that is, when a reference function with droop characteristics is used, the control may be referred to as droop control. As the respective power converters are droop-controlled autonomously and decentrally, the voltage of the DC bus may be stabilized while implementing power sharing among the respective devices based on the amount of power necessary for the DC bus.

SUMMARY

When a power fluctuates in a device that is connected to a power converter, other power converters that are connected to the same DC bus and that are subjected to the droop control perform output adjustment with delay. Therefore, for example, when the constant power load abruptly increases, the voltage of the DC bus decreases rapidly, and when the constant power load abruptly decreases, the voltage of the DC bus rapidly increases, and the DC bus may have voltage and power significantly deviated from the droop characteristics of the reference function. In a power converter in which the droop control is performed, a feedback control (power control) in which a target power is determined by observing an output voltage, and in which a difference between the target power and the output power is controlled to be zero, and a feedback control (voltage control) in which a target voltage is determined by observing an output power, and in which a difference between the target voltage and the output voltage is controlled to be zero are switched therebetween based on a power range or a voltage range of the DC bus, but when the voltage of the DC bus abruptly changes as described, if switching of the feedback control is not appropriately done, a problem that settling time increases when the voltage and the power are to be returned to those according to the reference function, or a problem of a steady-state deviation may occur.

There is a need for suppressing occurrence of a steady-state deviation with respect to a reference function defined at the time of voltage control, power control, or current control, and to reduce settling time.

According to one aspect of the present disclosure, there is provided a power converter including: a power converting unit configured to convert input power and output the converted power; and a control unit configured to control a power conversion characteristic of the power converting unit based on a reference function having a droop characteristic that is defined according to an input value, according to the input value in any one of voltage control, power control, and current control corresponding to the droop characteristic, wherein the reference function is constituted of a plurality of droop functions having droop characteristics different from one another connected at a connection point, a control area to define a range of voltage, power, and current in which corresponding voltage control, power control, or current control is performed is acquired for each of the droop functions, the control area is set, when an operating point determined by the input value fluctuates to deviate from the droop function, such that the operating point is not converged at a position outside a range defined at the connection point in the droop function, and that any one of fluctuation amount and fluctuation frequency of voltage, power, or current until the operating point is converged on the droop function present after the fluctuation is minimized, a control method of the power conversion characteristic is set based on the control area and the operating point, for any one of voltage control, power control, and current control, and when the operating point moves and changes the control area, the control area is changed according to the droop function corresponding to the control area after the move.

According to another aspect of the present disclosure, there is provided a power converter including: a power converting unit configured to convert input power and output the converted power; and a control unit configured to control a power conversion characteristic of the power converting unit based on a reference function having a droop characteristic that is defined according to an input value, according to the input value in any one of voltage control, power control, and current control corresponding to the droop characteristic, wherein the reference function is constituted of a plurality of droop functions having droop characteristics different from one another connected, a control area to define a range of voltage, power, and current in which corresponding voltage control, power control, or current control is performed is acquired for each of the droop functions, when an operating point determined by the input value is positioned on a droop function to perform voltage control, for a droop function other than the droop function having the operating point, a neighborhood of the droop function is set as a control area, and for the droop function having the operating point, an area except the control area of the other droop function is set as a control area, when the operating point is positioned on a droop function to perform power control or current control, and the droop function is a droop characteristic of a constant power or a constant current, the control area is set such that a control corresponding to a connected droop function is performed when a voltage of the operating point exceeds a connection point of the droop function, when the operating point is positioned on a droop function to perform power control or current control, and the droop function is not a droop characteristic of a constant power or a constant current, the control area is set such that a control corresponding to a connected droop function is performed when a power of the operating point exceeds a connection point of the droop function, a control method of the power conversion characteristic is set for any one of voltage control, power control, and current control based on the control area and the operating point, and when the operating point moves and changes the control area, the control area is changed according to the droop function corresponding to the control area after the move.

DETAILED DESCRIPTION

Hereinafter, embodiments of the present disclosure will be explained with reference to the drawings. The embodiments explained below are not intended to limit the present disclosure. Furthermore, in descriptions of the drawings, like reference symbols are assigned to like parts.

Configuration of Power System

Figure 1:
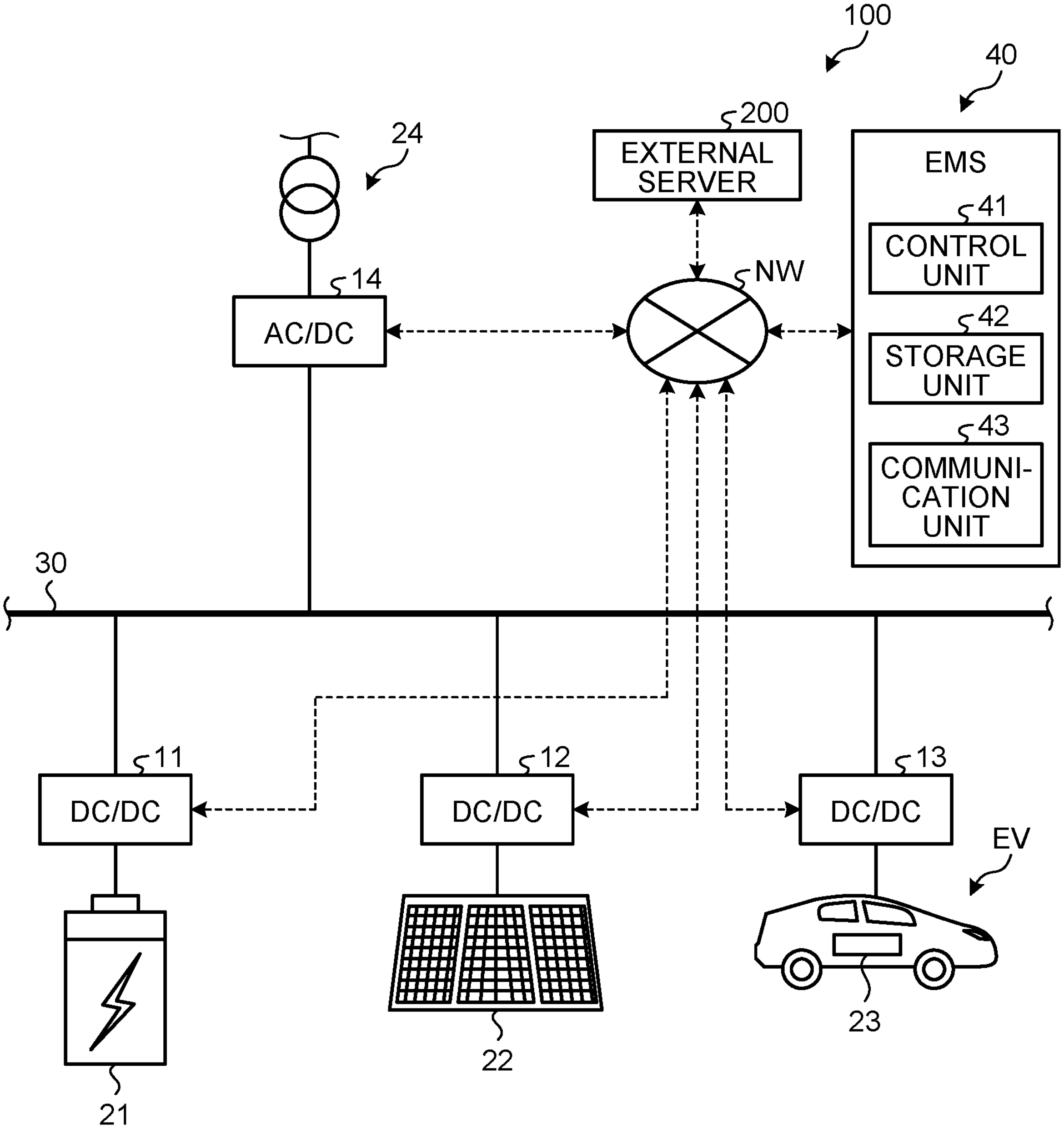
FIG. 1 is a diagram illustrating a configuration of a power system according to an embodiment.

FIG. 1 is a diagram illustrating a configuration of a power system according to an embodiment. A power system 100 includes plural power converters 11, 12, 13, 14, plural power elements 21, 22, 23, 24, and a bus 30. Furthermore, the power system 100 includes an energy management system (EMS) 40. The EMS 40 is one example of a central control unit.

The power converters 11, 12, 13 are DC/DC converter, and the power converter 14 is AC/DC converter. The power converters 11, 12, 13, 14 have a function of performing information communication by wire or by air. Configurations and functions of the power converters 11, 12, 13, 14 will be described in detail later.

The bus 30 is a DC bus in the power system 100, and is connected to the power converters 11, 12, 13, 14. In the power system 100, an electric power network including a DC grid is configured.

The power element 21 is, for example, a stationary battery storage that enables supply, use, and charging of electric power, and is connected to the power converter 11. The stationary battery storage is one example of a permanently installed in-facility energy storage. The power converter 11 has a function of converting a DC power supplied by the power element 21 to output to the bus 30, and converting a voltage of a DC power supplied from the bus 30 to output to, and charge the power element 21.

The power element 22 is, for example, a photovoltaic unit that is capable of generation and supply of electric power, and is connected to the power converter 12. The photovoltaic unit is one example of power generating equipment that generate electric power by using a renewable energy. The power converter 12 has a function of converting a voltage of a DC power supplied by the power element 22 to output to the bus 30.

The power element 23 is, for example, an onboard energy storage that enables supply, use, and charging of electric power, and is connected to the power converter 13. The onboard energy storage is installed on an electric vehicle EV, and is one example of mobile non-stationary energy storage. The power converter 13 has a function of converting a voltage of a DC power supplied by the power element 23 to output to the bus 30, and converting a voltage of a DC power supplied from the bus 30 to output to and charge the power element 23. The power converter 13 is installed, for example, in a charging station or residential charging equipment, but may also be installed on an electric vehicle EV.

The power element 24 is, for example, a commercial power grid, and is connected to the power converter 14. The power converter 14 converts an AC power supplied by the power element 24 into a DC power, to output to the bus 30, and converts a DC power supplied from the bus 30 into an AC power, to output to the power element 24. Output of power from the bus 30 to the power element 24 is also referred to as reverse power flow.

The EMS 40 has a function of managing a state of the power system 100 in an integrated manner. The EMS 40 includes a control unit 41, a storage unit 42, and a communication unit 43.

The control unit 41 is to perform various kinds of arithmetic processing to implement a function of the EMS 40, and includes, for example, a processor, such as a central processing unit (CPU), an application specific integrated circuit (ASIC), a field-programmable gate array (FPGA), a digital signal processor (DSP), and a graphics processing unit (GPU). Functions of the control unit 41 are implemented as a functional unit as the control unit 41 reads and executes various kinds of programs from the storage unit 42.

The storage unit 42 includes, for example, a read only memory (ROM) in which various kinds of programs and data that are used to perform the arithmetic processing by the control unit 41 and the like are stored. Moreover, the storage unit 42 includes, for example, a random access memory (RAM) that is used as a work space when the control unit 41 performs arithmetic processing, that is used to store a result of the arithmetic processing, and the like. The storage unit 42 may include an auxiliary storage device, such as a hard disk drive (HDD) and a solid state drive (SSD).

The communication unit 43 includes a communication module that performs information communication by wire or by air. The communication unit 43 performs information communication with the power converters 11, 12, 13, 14, or with an external server 200 through a network NW constituted of the Internet network, a mobile phone network, and the like.

The external server 200 is a server that is arranged outside the power system 100. The external server 200 is, for example, an information processing apparatus that functions as an EMS in other power systems, or an information processing apparatus that includes a database and functions as a data server for the EMS 40. The external server 200 stores various kinds of information that has a possibility to affect operation of the power system 100.

Configuration of Power Converter

Figure 2:
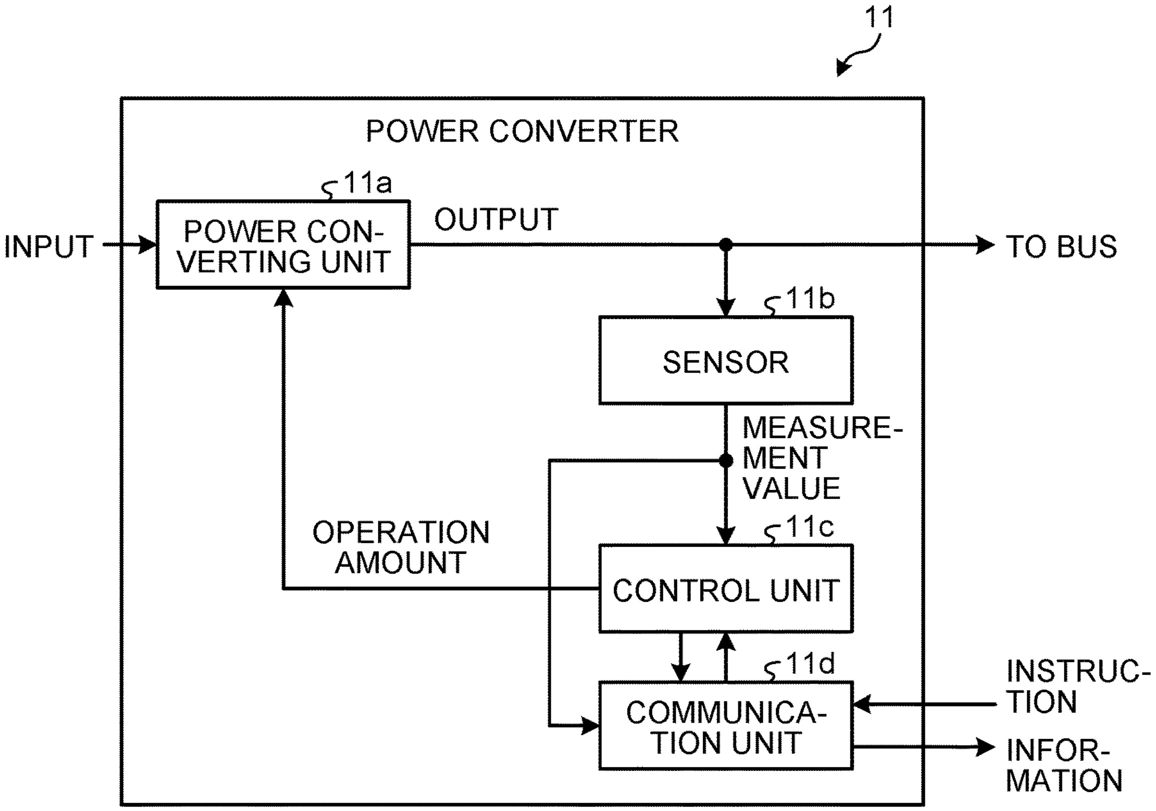
FIG. 2 is a diagram illustrating a configuration of a power converter illustrated in FIG. 1.

Next, a specific configuration of the power converter 11 will be explained. FIG. 2 is a diagram illustrating a configuration of the power converter 11. The power converter 11 includes a power converting unit 11*a*, a sensor 11*b*, a control unit 11*c*, and a communication unit 11*d*.

The power converting unit 11*a* performs DC/DC conversion in which a voltage of a DC power input from the discharging power element 21, to output to the bus 30. The power converting unit 11*a* may also convert a voltage of a DC power input from the bus 30 to output to, and charge the power element 21. The power converting unit 11*a* is constituted of an electric circuit including, for example, a coil, a capacitor, a diode, a switching device, and the like. The switching device is, for example, a field effect capacitor or an insulated gate bipolar transistor. The power converting unit 11*a* may control power conversion characteristics by, for example, pulse width modulation (PWM) control.

The sensor 11*b* measures an electrical characteristic value of a power on the bus 30 side of the power converting unit 11*a*. Therefore, the sensor 11*b* measures the electrical characteristic value of the power input to the power converter 11 or output from the power converter 11. The sensor 11*b* may measure a current value, a voltage value, an electric power value, and the like. The sensor 11*b* is one example of a measuring unit that acquires a measurement value. The sensor 11*b* outputs a measurement value of the electrical characteristic value to the control unit 11*c*.

The control unit 11*c* includes a processor that performs various kinds of arithmetic processing to control the operation of the power converting unit 11*a*, and a storage unit. For the processor and the storage unit, components exemplified as the components of the control unit 41 and the storage unit 42 may be used. Functions of the control unit 11*c* may be implemented as the processor reads and executes various kinds of programs from the storage unit, as a functional unit. For example, the control unit 11*c* controls the power conversion characteristics of the power converting unit 11*a* based on a reference function. Specifically, the control unit 11*c* outputs a PWM signal including information about operation amount (for example, duty ratio) for the PWM control to the power converting unit 11*a*, to PWM-control the power converting unit 11*a*. The control unit 11*c* may output the operation amount directly to the power converting unit 11*a*, or may output through another functional unit (for example, loop control unit) not illustrated.

The communication unit 11*d* includes a communication module that performs information communication by wire or by air, and a communication control unit that controls operation of the communication module. The communication unit 11*d* performs information communication with the EMS 40 through the network Nw. The communication unit 11*d* receives, for example, information or an instruction from the EMS 40, and outputs it to the control unit 11*c*. Furthermore, the communication unit 11*d* transmits, for example, information relating to a power situation input by the control unit 11*c*, to the EMS 40. When the information relating to a power situation is a measurement value obtained by the sensor 11*b*, the communication unit 11*d* may transmit the measurement value input from the sensor 11*b* to the EMS 40.

Figure 3:
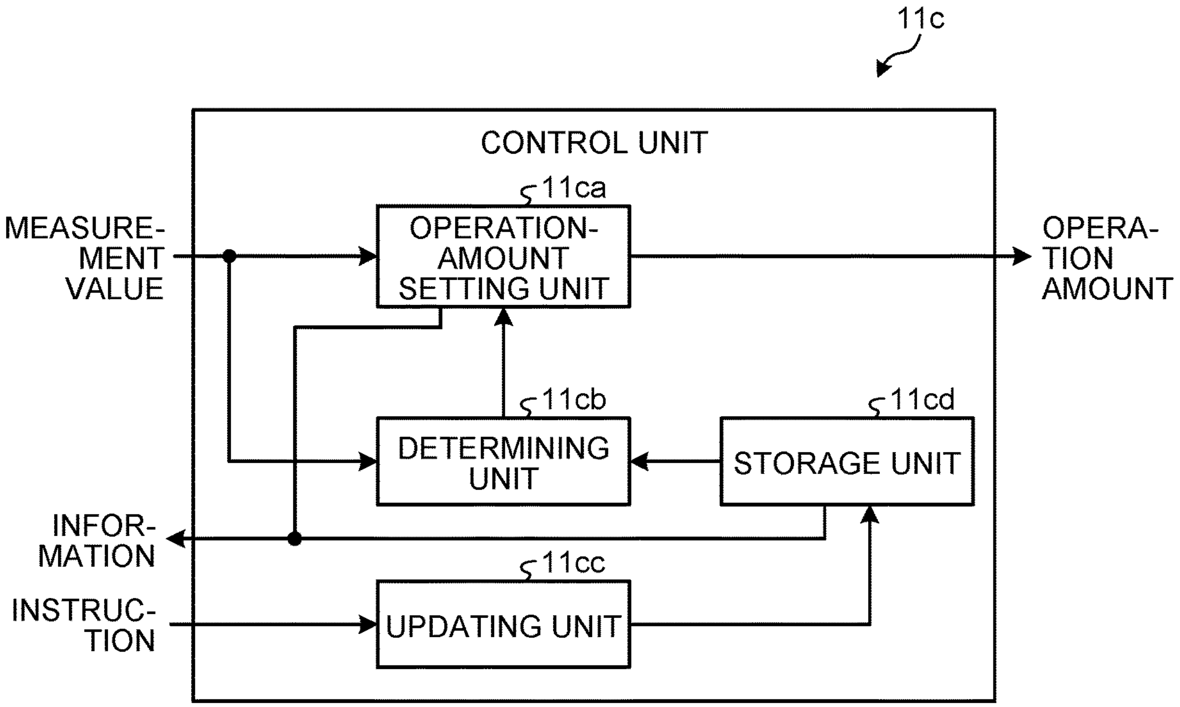
FIG. 3 is a diagram illustrating a configuration of a control unit illustrated in FIG. 2.

FIG. 3 is a diagram illustrating a component relating to a power converting function of the control unit 11*c*. The control unit 11*c* includes an operation-amount setting unit 11*ca*, a determining unit 11*cb*, an updating unit 11*cc*, and a storage unit 11*cd* that are functional units implemented through software by executing a program.

The updating unit 11*cc* causes the storage unit 11*cd* to store reference function information and control area information that are included in an update instruction input by the communication unit 11*d*, to update reference function information and control area information that have been stored in the storage unit 11*cd*. The reference function information is various kinds of information to identify a droop function constituting a reference function, and the control area information is various kinds of information to instruct a method of feedback control performed by the operation-amount setting unit 11*ca*, and will be described in detail later.

The determining unit 11*cb* acquires the control area information from the storage unit 11*cd*, determines a method of feedback control to be performed by the operation-amount setting unit 11*ca* based on the control area information, and outputs this determination result as determination information. The method of the feedback control includes a feedback control (hereinafter, referred to as droop P control) in which a target power Pref (one example of target value) is determined based on a measurement value Vo of a voltage obtained by the sensor 11*b* and the reference function information, and in which the operation amount is set such that a difference between Pref and a measurement value Po (one example of controlled value) of an electric power obtained by the sensor 11*b* is to be within an acceptable range, and a feedback control (hereinafter, referred to as droop V control) in which a target voltage Vref (one example of target value) is determined based on the measurement value Po of an electric power obtained by the sensor 11*b* and the reference function information, and in which the operation amount is set such that a difference between Vref and the measurement value Vo of a voltage obtained by the sensor 11*b* (one example of controlled value) is to be within an acceptable range. The droop P control, which is one example of a power control, and the droop V control, which is one example of a voltage control, are examples of a control method to control an output of the power converting unit 11*a*.

The operation-amount setting unit 11*ca* sets a method for the feedback control according to the determination information input from the determining unit 11*cb*, and sets an operation amount based on the measurement value input from the sensor 11*b* and the reference function information acquired from the storage unit 11*cd*, and outputs it to the power converting unit 11*a*. The feedback control performed by the operation-amount setting unit 11*ca* may be performed by using a publicly known method, such as PID control performed, for example, by reading parameters, such as a proportional gain, an integral time, and a derivative time, stored in the storage unit 11*cd*.

The storage unit 11*cd* or the operation-amount setting unit 11*ca* outputs information, such as the information relating to a power situation and the reference function information, to the communication unit 11*d*.

The other power converters 12, 13, 14 may have a configuration similar to that of the power converter 11. However, the power converting unit 11*a* of the power converter 14 is a so-called inverter that converts an AC power input from the power element 24 into a DC power to output to the bus 30, or that converts a DC power input from the bus 30 into an AC power to output to the power element 24.

Characteristics of Reference Function

Figure 4A:
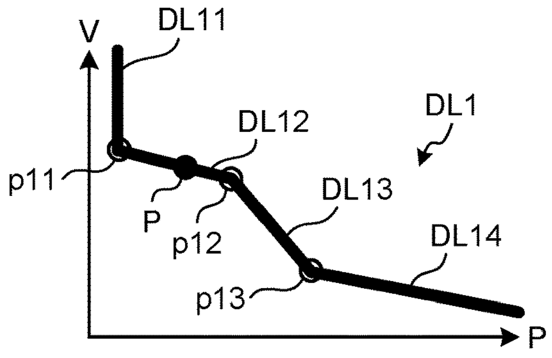
FIG. 4A is a diagram illustrating an example of a power conversion characteristic.
Figure 4B:
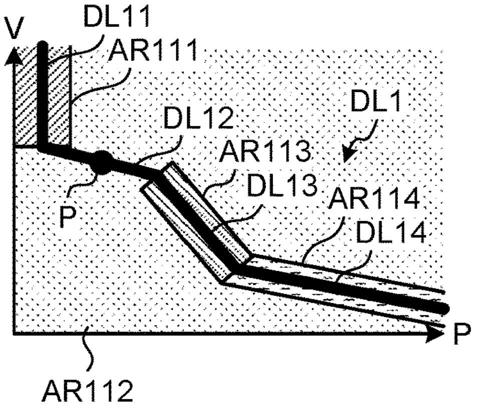
FIG. 4B is a diagram illustrating an example of a control area indicated by control area information.
Figure 4C:
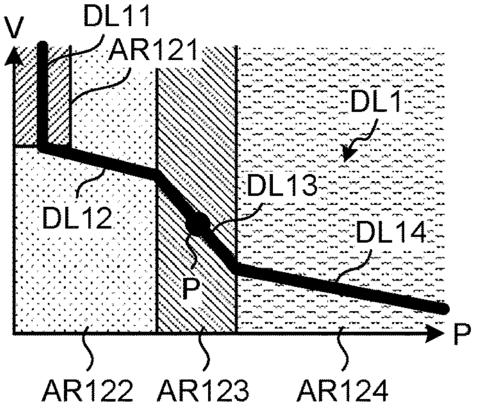
FIG. 4C is a diagram illustrating an example of a control area indicated by the control area information.
Figure 4D:
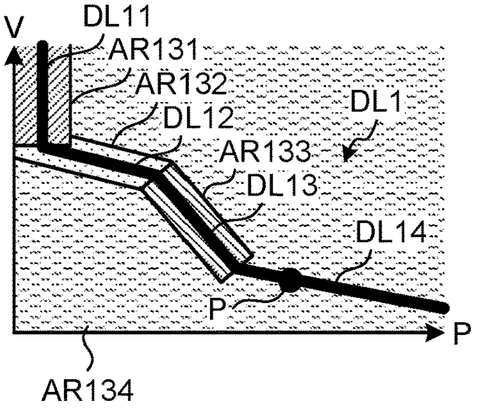
FIG. 4D is a diagram illustrating an example of a control area indicated by the control area information.

Next, the reference function and the control area information that are to be the basis to control the power conversion characteristics of the power converting unit 11*a* will be explained. FIG. 4A is a diagram illustrating an example of the power conversion characteristics, and FIG. 4B to FIG. 4D are diagrams illustrating an example of a control area.

FIG. 4A is a diagram showing a V-P characteristic that indicates a relationship between power (P) and voltage (V) on the bus 30 side of the power converting unit 11*a* included in the power converter 11, and it shows power conversion characteristics of the power converting unit 11*a* included in the power converter 11. Note that P takes a positive value when the power converting unit 11*a* is in a state of supplying power to the bus 30, that is, when the power element 21 is in a discharging state, and takes a negative value when power is supplied from the bus 30, that is, when the power element 21 is in a charging state.

A line DL1 in FIG. 4A is a straight line or a curved line that has a bend in the middle. The reference function expressed by this line DL1 is constituted of multiple droop functions that are defined according to a range of an input value, and the droop characteristics of which differ from one another connected thereto. Specifically, the line DL1 is constituted of a line DL11, a line DL12, a line DL13, and a line DL14 expressing four droop functions having droop characteristics different from one another connected thereto, and is identified by the reference function information.

The reference function information includes, for example, coordinate information of boundaries of the droop function in coordinates with P on a horizontal axis and V on a vertical axis, intercept information of the droop function, information about the slope (that is slope coefficient), and information about the shape (straight line, curved line, and the like). In the power converter 11, the control unit 11*c* controls the power conversion characteristic of the power converting unit 11*a* to have characteristics of the reference function indicated by the line DL1. That is, the control unit 11*c* of the power converter 11 controls the power converting unit 11*a* such that an operating point P defined by a value of V and a value of P on the bus 30 side of the power converting unit 11*a* is positioned on the line DL1. In the line DL1, the slope of the line DL11 is larger than the slope of the line DL13, and is perpendicular to a P-axis.

FIG. 4B to FIG. 4D are diagrams illustrating one example of the control area indicated by the control area information corresponding to the line DL1 stored in the storage unit 11*cd*. The control area is to determine a feedback control method to be performed according to the position of the operating point P, and defines a range of voltage and power subject to the corresponding droop P control or droop V control for each of a droop function. Specifically, for the control area, a type of electrical characteristic value of a measurement value, a controlled value, and a target value is set according to the droop characteristics of a corresponding droop function, and when the absolute value of a droop coefficient of a droop function is equal to or larger than a predetermined value, a voltage value is selected as the measurement value, and an electric power value is selected as the controlled value and the target value, and the droop P control is set.

Moreover, when the absolute value of the droop coefficient is smaller than the predetermined value, an electric power value is selected as the measurement value, and a voltage value is selected as the controlled value and the target value, and the droop V control is set. Furthermore, the respective control areas are set such that the operating point P is not to be converged outside a range of a point of connection of the corresponding droop function. The determining unit 11*cb* determines a method of a feedback control to be performed by the operation-amount setting unit 11*ca* based on the position of the operating point P in the control area, and outputs a determination result as the determination information.

In FIG. 4B, a control area AR111 indicated by left-downward diagonal hatching including the line DL11 indicates a region in which a control to position the operating point P on the line DL11 is performed by the droop P control, a control area AR113 indicated by right-downward hatching including the line DL13 indicates a region in which a control to position the operating point P on the line DL13 is performed by the droop P control, and a control area AR114 indicated by horizontal broken-line hatching including the line DL14 indicates a region in which a control to position the operating point P on the line DL14 is performed by the droop V control. Moreover, a control area AR112 that is a region indicated by vertical broken-line hatching including the line DL12 and excluding the control area AR111, the control area AR113, and the control area AR114 indicates a region in which a control to position the operating point P on the line DL12 is performed by the droop V control.

In FIG. 4C, a control area AR121 indicated by left-downward diagonal hatching including the line DL11 indicates a region in which a control to position the operating point P on the line DL11 is performed by the droop P control. A control area AR122 indicated by vertical broken-line hatching including the line DL12 and excluding the control area AR121 on a P-axis negative side from a connection point of the line DL12 and the line DL13 indicates a region in which a control to position the operating point P on the line DL12 is performed by the droop V control. A control area AR123 that is a region including the line DL13 and positioned between a connection point p12 connecting the line DL12 and the line DL13 and a connection point p13 connecting the line DL13 and the line DL14, indicated by right-downward hatching indicates a region in which a control to position the operating point P on the line DL13 is performed by the droop P control. A control area AR124 that is a region including the line DL14 and that is positioned on a P-axis positive side from the connection point p13 connecting the line DL13 and the line DL14 indicated by horizontal broken-line hatching indicates a region in which a control to position the operating point P on the line DL14 is performed by the droop V control.

In FIG. 4D, a control area AR131 including the line DL11 indicated by left-downward diagonal hatching indicates a region in which a control to position the operating point P on the line DL11 is performed by the droop P control, a control area AR132 including the line DL12 indicated by vertical broken-line hatching indicates a region in which a control to position the operating point P on the line DL12 is performed by the droop V control, and a control area AR133 including the line DL13 indicated by right-downward diagonal hatching indicates a region in which a control to position the operating point P on the line DL13 is performed by the droop P control. Moreover, a control area AR131 that is a region including the line DL14 and excluding the control area AR131, the control area AR132, and the control area AR133, indicated by horizontal broken-line hatching indicates a region in which a control to position the operating point P on the line DL14 is performed by the droop V control.

Figure 5A:
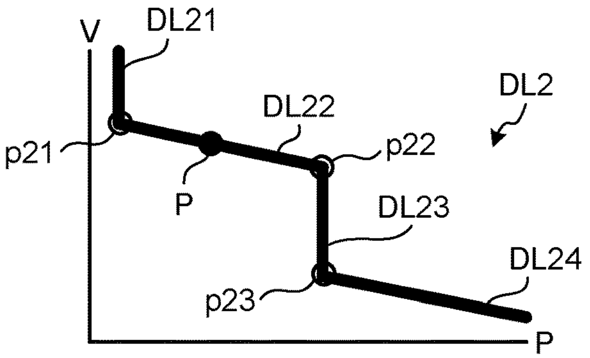
FIG. 5A is a diagram illustrating an example of a power conversion characteristic.
Figure 5B:
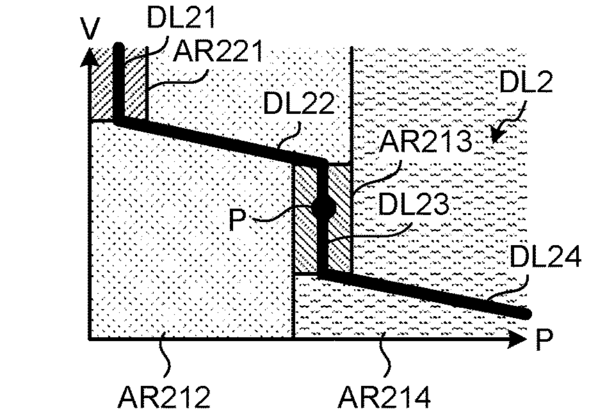
FIG. 5B is a diagram illustrating an example of a control area indicated by the control area information.
Figure 5C:
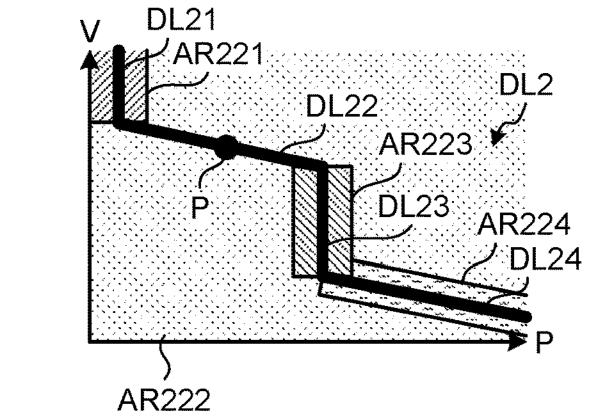
FIG. 5C is a diagram illustrating an example of a control area indicated by the control area information.
Figure 5D:
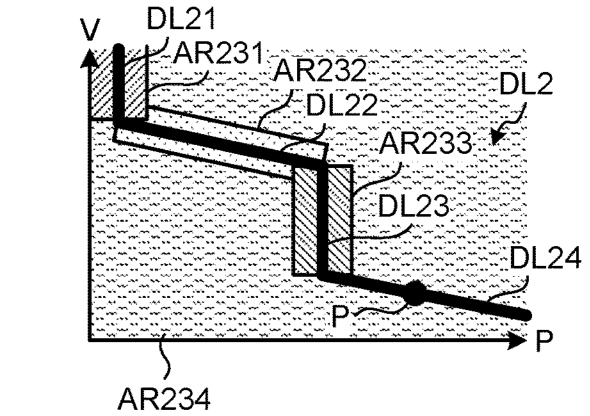
FIG. 5D is a diagram illustrating an example of a control area indicated by the control area information.

FIG. 5A is a diagram illustrating an example of power conversion characteristics, and FIG. 5B to FIG. 5D are diagrams illustrating other examples of the control area. FIG. 5A shows power conversion characteristics of the power converting unit 11*a*. A line DL2 in FIG. 5A is a straight line or a curved line that has a bend in the middle. The reference function expressed by this line DL2 is constituted up of lines that is defined according to a range of an input value, and that expresses four droop functions having droop characteristics different from one another connected, and the line DL2 is identified by the reference function information similarly to the line DL1. Specifically, the line DL2 is constituted of the line DL21, the line DL22, the line DL23, and the line DL24 expressing four droop functions having droop characteristics different from one another connected, and is identified by the reference function information.

When the reference function information is not indicating the reference function illustrated in FIG. 5A, the control unit 11*c* controls the power conversion characteristics of the power converting unit 11*a* to have characteristics of the reference function indicated by the line DL2. That is, the control unit 11*c* of the power converter 14 controls the power converting unit 11*a* such that the operating point P defined by the value of V and the value of P is positioned on the line DL2. The line DL21 and the line DL23 are perpendicular to the P-axis.

FIG. 5B to FIG. 5D are diagrams illustrating an example of a control area indicated by the control area information corresponding to the line DL2 stored in the storage unit 11*cd*. In FIG. 5B, a control area AR211 including the line DL21 indicated by left-downward diagonal hatching indicates a region in which a control to position the operating point P on the line DL21 is performed by the droop P control, a control area AR212 including the line DL22 indicated by vertical broken-line hatching indicates a region in which a control to position the operating point P on the line DL22 is performed by the droop V control. Moreover, a control area AR213 including the line DL23 indicated by right-downward diagonal hatching indicates a region in which a control to position the operating point P on the line DL23 is performed by the droop P control, and a control area AR214 including the line DL24 indicated by horizontal broken-line hatching indicates a region in which a control to position the operating point P on the line DL24 is performed by the droop V control.

In FIG. 5C, a control area AR221 including the line DL21 indicated by left-downward diagonal hatching indicates a region in which a control to position the operating point P on the line DL21 is performed by the droop P control, a control area AR223 including the line DL23 indicated by right-downward diagonal hatching indicates a region in which a control to position the operating point P on the line DL23 is performed by the droop P control, and a control area AR224 including the line DL24 indicated by horizontal broken-line diagonal hatching indicates a region in which a control to position the operating point P on the line DL24 is performed by the droop V control. Furthermore, a control area AR221 that is a region including the line DL22 and excluding the control area AR221, the control area AR223, and the control area AR224 indicated by vertical broken-line hatching indicates a region in which a control to position the operating point P on the line DL22 is performed by the droop V control.

In FIG. 5D, a control area AR231 including the line DL21 indicated by left-downward diagonal hatching indicates a region in which a control to position the operating point P on the line DL21 is performed by the droop P control, a control area AR232 including the line DL22 indicated by vertical broken-line hatching indicates a region in which a control to position the operating point P on the line DL22 is performed by the droop V control, and a control area AR233 including the line DL23 indicated by right-downward diagonal hatching indicates a region in which a control to position the operating point P on the lined DL23 by the droop P control. Moreover, a control area AR232 including the line DL24 and excluding the control area AR231, the control area AR232, and the control area AR233 indicated by horizontal broken-line hatching indicates a region in which a control to position the operating point P on the line DL24 is performed by the droop V control.

Control Method

Next, a control method of the power converters 11, 12, 13, and 14, and a control method of the power system 100 will be explained. In the power system 100, so-called autonomous control in which the power converters 11, 12, 13, 14 individually perform autonomous and decentralized control, and centralized control in which the EMS 40 performs coordinated control of the power converters 11, 12, 13, 14 according to a power situation of the power system 100 may be performed. For example, the autonomous control is repeatedly performed in relatively short cycles, and the centralized control is performed in cycles longer than the cycle of the centralized control. The autonomous control is also called primary control, and the centralized control is also called secondary control. These control methods are implemented, for example, as a program causing a processor to perform in the respective power converters or in the EMS 40.

Autonomous Control

First, the control method of the power converters 11, 12, 13, 14 in the autonomous control will be explained with the power converter 11 as an example. For the other power converters 12 and 13 also, the control method similar to explanation below may be performed appropriately. When the power element 22 is an element for which a power generation amount is not to be controlled in the viewpoint of efficiency, such as photovoltaic unit, when power according to the power generation amount is input from the power element 22, the power converter 12 may perform a control of the maximum power point tracking (MPPT) method to control an output power to the bus 30 is maximized with the power generation amount.

In the control method of the power converter 11, the control unit 11*c* performs a control step of controlling the power conversion characteristics of the power converter 11, that is, the power conversion characteristics of the power converting unit 11*a* based on the reference function information and the control area information.

Figure 6:
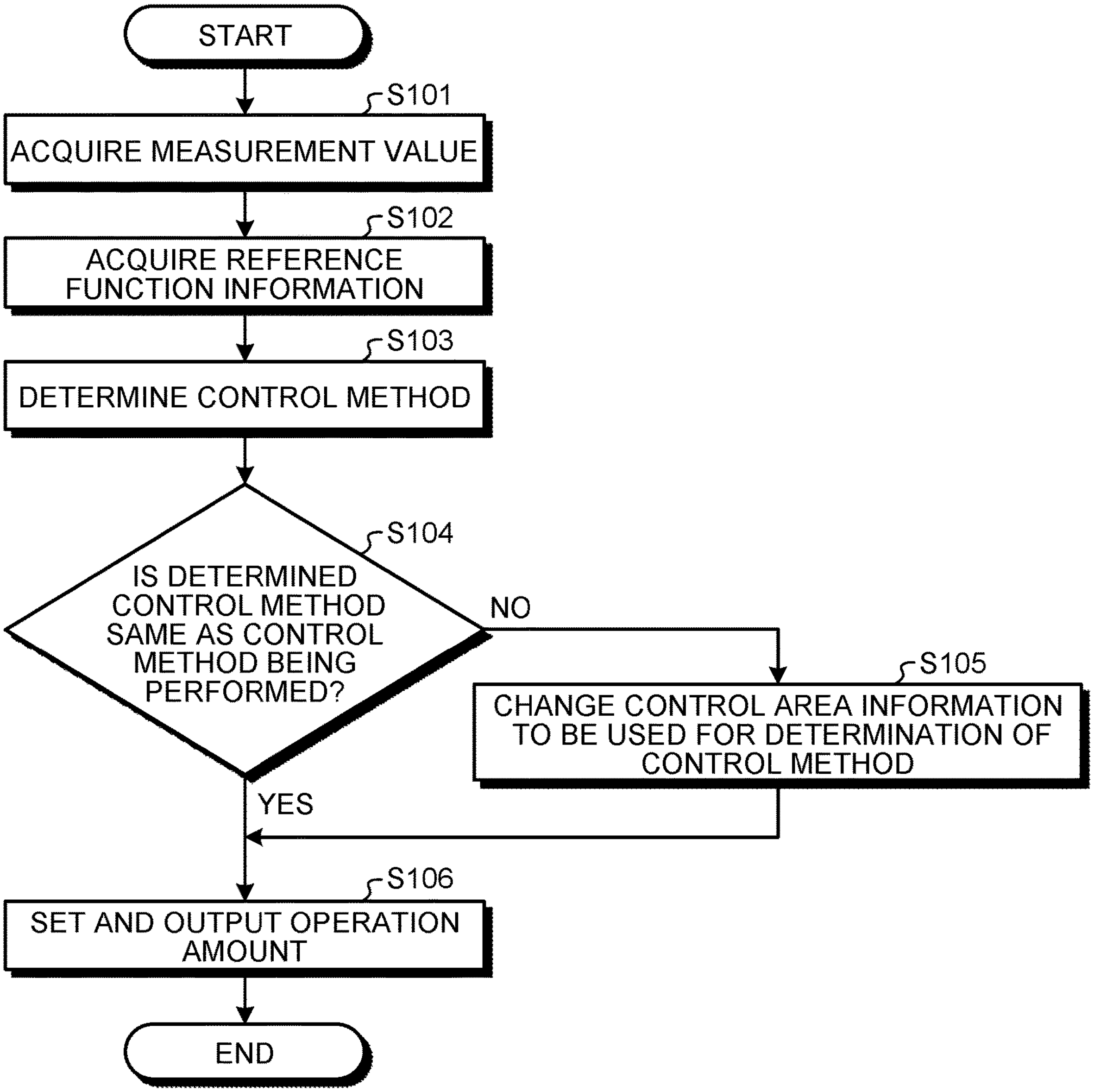
FIG. 6 is a flowchart illustrating a flow of processing performed by the control unit of the power converter.

An example of details of this control step will be explained more specifically, referring to FIG. 4B to FIG. 4D, FIG. 5B to FIG. 5D, FIG. 6, and FIG. 7A to FIG. 7D. FIG. 6 is a flowchart illustrating a flow of processing performed by the control unit 11*c*.

First, in the control unit 11*c*, the operation-amount setting unit 11*ca* acquires a measurement value from the sensor 11*b* (step S101). Subsequently, in the control unit 11*c*, the operation-amount setting unit 11*ca* acquires the reference function information from the storage unit 11*cd* (step S102).

Subsequently, in the control unit 11*c*, the determining unit 11*cb* determines a feedback control method to be performed by the operation-amount setting unit 11*ca* based on the measurement value and the control area information that has been acquired from the storage unit 11*cd* and the position of the operating point P in the control area (step S103). Processing of reading the control area information from the storage unit 11*cd* is an example of a step of the determining unit 11*cb* acquiring the control are information. Subsequently, the control unit 11*c* determines whether the feedback control method determined by the determining unit 11*cb* is the same as the feedback control method currently being performed by the operation-amount setting unit 11*ca* (step S104).

When the feedback control method determined by the determining unit 11*cb* is the same as the feedback control method currently being performed by the operation-amount setting unit 11*ca*, (step S104: YES), the control unit 11*c* proceeds to step S106.

In the control unit 11*c*, when the feedback control method determined by the determining unit 11*cb* is different from the feedback control method currently being performed by the operation-amount setting unit 11*ca* (step S104: NO), the determining unit 11*cb* acquires the control area information to be used for determination of the feedback control method from the storage unit 11*cd* and changes it (step S105). Step S105 is an example of a step of changing the control area.

Specifically, when the feedback control method determined at step S103 is the droop V control, the determining unit 11*cb* changes the control area information such that a control area corresponding to droop functions other than a droop function for which the operating point P is converged by the droop V control is a neighborhood of the droop functions, and based on the determined droop voltage control, the control area where said operating point converges on is a separate control area from the rest of the plurality of remapped control areas. The neighborhood of the droop function is a region having a predetermined width in a direction perpendicular to a straight line when the droop function is a straight line, and is a region having a predetermined width in a direction perpendicular to a tangent line when the droop function is a curved line. This predetermined width is set to a width according to a desired control.

For example, the determining unit 11*cb* changes it to the control area information illustrated in FIG. 4B when the feedback control method determined at step S103 is the droop V control to converge the operating point P on the line DL12, and to the control area information illustrated in FIG. 4D when the feedback control method determined at step S103 is the droop V control to converge the operating point P on the line DL14. Moreover, the determining unit 11*cb* changes it to the control area information illustrated in FIG. 5C when the feedback control method determined at step S103 is the droop V control to converge the operating point P on the line DL22, and to the control area information illustrated in FIG. 5D when the feedback control method determined at step S103 is the droop V control to converge the operating point P on the line DL24.

Furthermore, when the feedback control method determined at step S103 is the droop P control and the slope of the droop function for which the operating point P is converged by this droop P control is not perpendicular to the P-axis, the determining unit 11*cb* changes the control area information to that indicating a control area that is divided at a connection point of droop functions in the P-axis direction for the droop function, the slope of which is not perpendicular to the P-axis. For example, when the feedback control method determined at step S103 is the droop P control to converge the operating point P on the line DL13, the determining unit 11*cb* changes it to the control area information illustrated in FIG. 4C.

Moreover, when the feedback control method determined at step S103 is the droop P control, and the slope of the droop function to converge the operating point P by this droop P control is perpendicular to the P-axis, the determining unit 11*cb* changes the control area information to that indicating a control area, the range in a V-axis direction of which is from an upper end to a lower end of the droop function for the droop function of the droop P control perpendicular to the P-axis, and a control area divided at a connection point of droop functions in the P-axis direction. For example, the determining unit 11*cb* changes it to the control area information illustrated in FIG. 5B when the feedback control method determined at step S103 is the droop P control to converge the operating point P on the line DL21 or the line DL23.

Subsequently, in the control unit 11*c*, the operation-amount setting unit 11*ca* acquires determination information output from the determining unit 11*cb*, and sets an operation amount to perform the feedback control by the control method based on the acquired determination information based on the measurement value and the reference function information, to output to the power converting unit 11*a* (step S106). Thus, the control of the power converting unit 11*a* is performed. Step S106 is one example of a step of setting a control method of power conversion characteristics to voltage control or power control.

Next, an operation example of the power converter 11 when an output of a device connected to the bus 30 fluctuates will be explained, comparing with a configuration in which setting of the control area is not appropriate and the control area information is not changed.

Figure 7A:
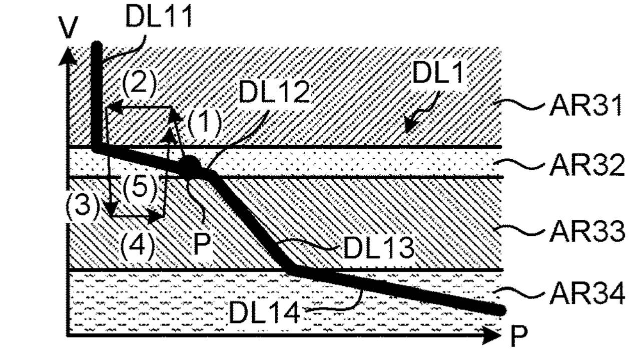
FIG. 7A is a diagram illustrating a comparative example of a control area.

First, FIG. 7A is a diagram illustrating an example in which a control area is divided by voltage for the reference function indicated by the line DL1. In FIG. 7A, a control area AR31 including the line DL11 indicates a region in which a control to position the operating point P on the line DL11 by the droop P control, and a control area AR32 including the line DL12 indicates a region in which a control to position the operating point P on the line DL12 by the droop V control. Furthermore, in FIG. 7A, a control area AR33 including the line DL13 indicates a region in which a control to position the operating point P on the line DL13 by the droop P control, and a control area AR34 including the line DL14 indicates a region in which a control to position the operating point P on the line DL14 by the droop V control.

When the feedback control is performed based on the reference function and the control area indicated in FIG. 7A, the control unit 11*c* performs the droop V control when the operating point P is positioned on the line DL12. In this state, for example, when the load of a power element connected to the bus 30 decreases, a current supplied to the bus 30 increases, and a voltage of the bus 30 transiently increases if the transient response characteristic is slow and, therefore, the operating point P moves to the control area AR31 as indicated by an arrow (1). Because the control unit 11*c* performs the droop P control such that the operating point P is positioned on the line DL11 when the operating point P moves from the control area AR32 to the control area AR31, an output current of the power element 21 connected to the power converter 11 abruptly decreases, and the operating point P moves as indicated by an arrow (2). Because the voltage of the bus 30 transiently decreases when the output current of the power element 21 decreases, the operating point P moves to the control area AR33 as indicated by an arrow (3). Because the control unit 11*c* performs the droop P control so that the operating point P is positioned on the line DL 13 when the operating point P moves from the control area AR31 to the control area AR33, the output current of the power element 21 connected to the power converter 11 abruptly increases, and the operating point P moves as indicated by an arrow (4). Because the voltage of the bus 30 transiently increases when the output current of the power element 21 abruptly increases, the operating point P moves again to the control area AR31 as indicated by an arrow (5). As described, if the control area is divided by voltage, the operating point P is not converged on the line DL1, and the voltage and the current of the bus 30 fluctuates repeatedly, that is, a phenomenon that the operating point P repeatedly fluctuates over the droop function may occur.

On the other hand, in the present embodiment, when the operating point P is on the line DL12, the control area is to be as illustrated in FIG. 4B. In this case, when the load decreases in the power element connected to the bus 30, although the current supplied to the bus 30 increases and the voltage of the bus 30 transiently increases, the position of the operating point P is positioned in the control area AR112. Because the control unit 11*c* performs the droop V control so that the operating point P is positioned on the line DL12, the operating point P is converged on the line DL12, and repeated fluctuation of the voltage and the current of the bus 30 does not occur as in the comparative example described above, that is, the operating point P does not fluctuate over the droop function repeatedly.

Figure 7B:
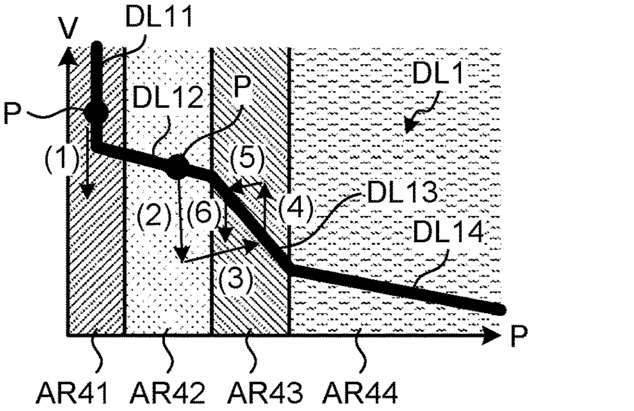
FIG. 7B is a diagram illustrating a comparative example of a control area.

Next, FIG. 7B is a diagram illustrating an example in which a control area is divided by power for the reference function indicated by the line DL1. In FIG. 7B, a control area AR41 including the line DL11 indicates a region in which a control to position the operating point P on the line DL11 by the droop P control, and a control area AR42 including the line DL12 indicates a region in which a control to position the operating point P on the line DL12 by the droop V control. Moreover, in FIG. 7B, a control area AR43 including the line DL13 indicates a region in which a control to position the operating point P on the line DL13 by the droop P control, and a control area AR44 including the line DL14 indicates a region in which a control to position the operating point P on the line DL14 by the droop V control.

The control unit 11*c* performs the droop P control when the operating point P is on the line DL11 when the feedback control is to be performed based on the reference function and the control area indicated in FIG. 7B. In this state, for example, when the load increases in the power element connected to the bus 30, the current supplied to the bus 30 decreases and the voltage of the bus 30 transiently decreases if the transient response characteristic is slow and, therefore, the operating point P moves down as indicated by an arrow (1). Because the control unit 11*c* performs the droop P control according to the control area AR41, the operating point P is still positioned on an extension of the line DL11, and a steady-state deviation occurs.

On the other hand, in the present embodiment, when the operating point P is positioned on the line DL11, the control area is to be as illustrated in FIG. 4C. In this case, when the load increases in the power element connected to the bus 30, because the current supplied to the bus 30 decreases and the voltage of the bus 30 transiently decreases, the operating point P moves down but the position of the operating point P is positioned in the control area AR122. The control unit 11*c* performs the droop V control so that the operating point P is positioned on the line DL12. Because the feedback control method to be performed is the droop V control, not the droop P control that has been performed up to this point, the control unit 11*c* changes the control area to be used for determination of the control method to be performed to the control area indicated in FIG. 4B at step S105 described above.

Subsequently, when the control unit 11*c* performs the droop V control such that the operating point P is converged on the line DL12 according to the control area indicated in FIG. 4B after the change, the operating point P moves to the control area AR113. The control unit 11*c* performs the droop P control such that the operating point P is positioned on the line DL13. Moreover, because the feedback control method to be performed is changed to the droop P control different from the droop V control that has been performed up to this point, the control unit 11*c* changes the control area used for determination of the control method to be performed to the control area indicated in FIG. 4C at step S105 described above. Subsequently, when the control unit 11*c* performs the droop P control so that the operating point P is converged on the line DL13 according to the control area indicated in FIG. 4C after the change, the operating point P is converged on the line DL13 and, therefore, is not to stay positioned on an extension of the line DL11 and a steady-state deviation does not occur.

Next, a case in which the control unit 11*c* performs a feedback control based on the reference function and the control area indicated in FIG. 7B, and the operating position P is on the line DL12 will be explained. In this case, the control unit 11*c* performs the droop V control. In this state, for example, when the load increases in the power element connected to the bus 30, the current supplied to the bus 30 decreases, and the voltage of the bus 30 transiently decreases if the transient response characteristic is slow, and, therefore, the operating point P moves down as indicated by an arrow (2). Because the control unit 11*c* performs the droop P control so as to converge on the line DL12 according to the control area AR42, the output current of the power element

21 connected to the power converter 11 increases and the operating point P moves as indicated by an arrow (3).

When the output current of the power element 21 increases, the operating point P moves to the control area AR43. When the operating point P moves from the control area AR42 to the control area AR43, the control unit 11*c* performs the droop P control so that the operating point P is positioned on the line DL13 and, therefore, the output current of the power element 21 abruptly increases. When the output current of the power element 21 abruptly increases, the voltage of the bus 30 transiently increases and, therefore, the operating point P is to be positioned above the line DL13 as indicated by an arrow (4). Because the control unit 11*c* performs the droop P control to position the operating point P on the DL 13, the output current of the power element 21 decreases, and the operating point P moves as indicated by an arrow (5). When the output current of the power element 21 abruptly decreases, the voltage of the bus 30 abruptly decreases and, therefore, the operating point P is to be positioned below the line DL13 as indicated by an arrow (6). Because the control unit 11*c* performs the droop P control so that the operating point P is positioned on the line DL13, the output current of the power element 21 abruptly increases again. As described, when the control area is divided by power with respect to the droop function of the line DL13 that is not perpendicular to the P-axis, fluctuation of the voltage and the current increases, and the voltage and the current repeatedly fluctuate, that is, the operating point P repeatedly fluctuates over the droop function, possibly causing a problem that it takes time to converge the operating point on the line DL13.

On the other hand, in the present embodiment, when the operating point P is positioned on the line DL12, the control area is to be as illustrated in FIG. 4B. When the load increases in a power element connected to the bus 30 in this state, the current supplied to the bus 30 decreases and the voltage of the bus 30 transiently decreases and, therefore, the operating point P moves down. Because the control unit 11*c* performs the droop V control according to the control area AR112, the operating point P moves toward a positive side of the P-axis, and moves to the control area AR113. When the operating point P has moved to the control area AR113, the control unit 11*c* performs the droop P control so that the operating point P is positioned on the line DL13. Because the control area AR113 is near the line DL13, abrupt increase of the output current of the power element 21 does not occur. Moreover, because the feedback control method to be performed is changed to the droop P control different from the droop V control that has been performed up to this point, the control unit 11*c* changes the control area used for determination of a feedback control method to be performed to the control area indicated in FIG. 4C. Subsequently, when the control unit 11*c* performs the droop P control according to the control area indicated in FIG. 4C after the change, the operating point P is converged on the line DL13 and, therefore, the voltage and the current do not fluctuate repeatedly, that is, the operating point P does not fluctuate repeatedly over the droop function, and the frequency of the operating point becomes lower than the comparative example to decrease the settling time, and it does not take time to converge the operating point P on the line DL13.

Figure 7C:
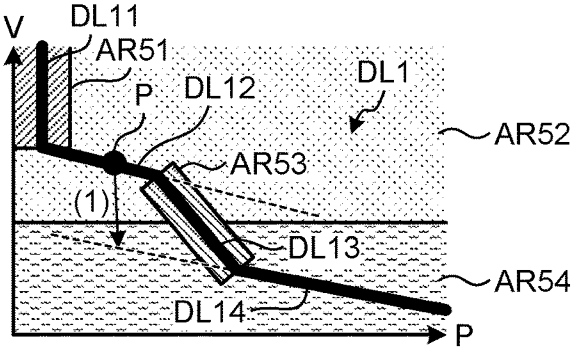
FIG. 7C is a diagram illustrating a comparative example of a control area.

Next, FIG. 7C illustrates an example of a control area in which an area including a droop function to perform the droop V control is made large for the reference function indicated by the line DL1. In FIG. 7C, a control area AR51 including the line DL11 indicates a region in which a control to position the operating point P on the line DL11 by the droop P control, and a control area AR52 including the line DL12 indicates a region in which a control to position the operating point P on the line DL12 by the droop V control. Moreover, in FIG. 7C, a control area AR53 including the line DL13 indicates a region in which a control to position the operating point P on the line DL13 by the droop P control, and a control area AR54 including the line DL14 indicates a region in which a control to position the operating point P on the line DL14 by the droop V control.

When the feedback control is performed based on the reference function and the control area indicated in FIG. 7C, the control unit 11*c* performs the droop V control when the operating point P is positioned on the line DL12. In this state, for example, when the load of a power element connected to the bus 30 increases, a current supplied to the bus 30 decreases, and a voltage of the bus 30 transiently decreases if the transient response characteristic is slow and, therefore, the operating point P moves to the control area AR54 as indicated by an arrow (1). Because the control unit 11*c* performs the droop P control such that the operating point P is positioned on the line DL14 when the operating point P moves to the control area AR54, the operating point P is converged on an extension of the line DL14 indicated by a broken line in FIG. 7C, and a steady-state deviation occurs.

On the other hand, in the present embodiment, when the operating point P is positioned on the line DL12, the control area is to be as illustrated in FIG. 4B. In this case, when the load increases in the power element connected to the bus 30, although the current supplied to the bus 30 decreases and the voltage of the bus 30 transiently decreases, the operating point P is converged on the line DL13 as described above and, therefore, a steady-state deviation does not occur.

Figure 7D:
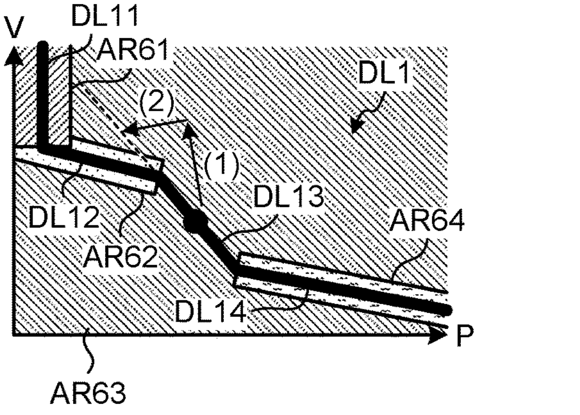
FIG. 7D is a diagram illustrating a comparative example of a control area.

Next, FIG. 7D is a diagram illustrating an example of a control area in which an area including the droop function to perform the droop P control, the slope of which is not perpendicular to the P-axis is made large for the reference function indicated by the line DL1. In FIG. 7D, a control area AR61 including the line DL11 indicates a region in which a control to position the operating point P on the line DL11 by the droop P control, a control area AR62 including the line DL12 indicates a region in which a control to position the operating point P on the line DL12 by the droop V control, and a control area AR64 including the line DL14 indicates a region in which a control to position the operating point P on the line DL14 by the droop V control. Moreover, in FIG. 7D, a control area AR63 including the line DL13 and excluding the control area AR61, the control area AR62, and the control area AR63 indicates a region in which a control to position the operating point P on the line DL13 by the droop P control.

When the feedback control is performed based on the control area indicated in FIG. 7D, the control unit 11*c* performs the droop P control when the operating point P is positioned on the line DL13. In this state, for example, when the load of a power element connected to the bus 30 decreases, a current supplied to the bus 30 increases, and a voltage of the bus 30 transiently increases if the transient response characteristic is slow and, therefore, the operating point P moves sharply upward as indicated by an arrow (1). Because the control unit 11*c* performs the droop P control such that the operating point P is positioned on the line DL13 as indicated by the arrow (2) when the operating point P sharply moves upward, the operating point P is converged on an extension of the line DL13 indicated by a broken line in FIG. 7D, and a steady-state deviation occurs.

On the other hand, in the present embodiment, when the operating point P is positioned on the line DL13, the control area is to be as illustrated in FIG. 4C. In this case, when the load decreases in the power element connected to the bus 30, because the current supplied to the bus 30 increases and the voltage of the bus 30 transiently increases, the operating point P moves upward. Because the control unit 11*c* performs the droop P control such that the operating point P is positioned on the line DL13, the output current of the power element 21 connected to the power converter 11 decreases and the operating point P moves to the control area AR122. The control unit 11*c* performs the droop V control so that the operating point P is positioned on the line DL12. Moreover, because the feedback control method to be performed is changed to the droop V control different from the droop P control that has been performed up to this point, the control unit 11*c* changes the control area used for determination of the control method to be performed to the control area indicated in FIG. 4B. Subsequently, when the control unit 11*c* performs the droop V control so that the operating point P is converged on the line DL12 according to the control area indicated in FIG. 4B after the change, the operating point P is converged on the line DL12, and a steady-state deviation does not occur.

As explained above, according to the autonomous control of the present embodiment, the control area is appropriately set and, therefore, a steady-state deviation does not occur even if the operating point P moves significantly. Moreover, according to the present embodiment, because the control area is appropriately changed according to the position of the operating point P, the settling time may be reduced.

Centralized Control

Next, the centralized control will be explained. In an example below, the centralized control is performed as the EMS 40 that is arranged externally to the power converters 11, 12, 13, 14 updates the reference function and the control area information used by the power converters 11, 12, 13, 14 for control, in response to an instruction. Updating the reference function and the control area in response to an instruction means that the instruction includes reference function information relating to the reference function and the control area information, and some or all of the reference functions and the control area are updated by the instruction. The storage unit 11*cd* of the respective power converters 11, 12, 13, 14 stores the reference function information and the control area information in an updatable manner.

For example, in information communication between the EMS 40 and the power converters 11, 12, 13, 14, an instruction signal for performing update of reference functions includes the reference function information and the control area information described above. The reference function information and the control area information used for the update are stored in the storage unit 42 of the EMS 40, and the control unit 41 appropriately retrieves to use them.

Figure 8:
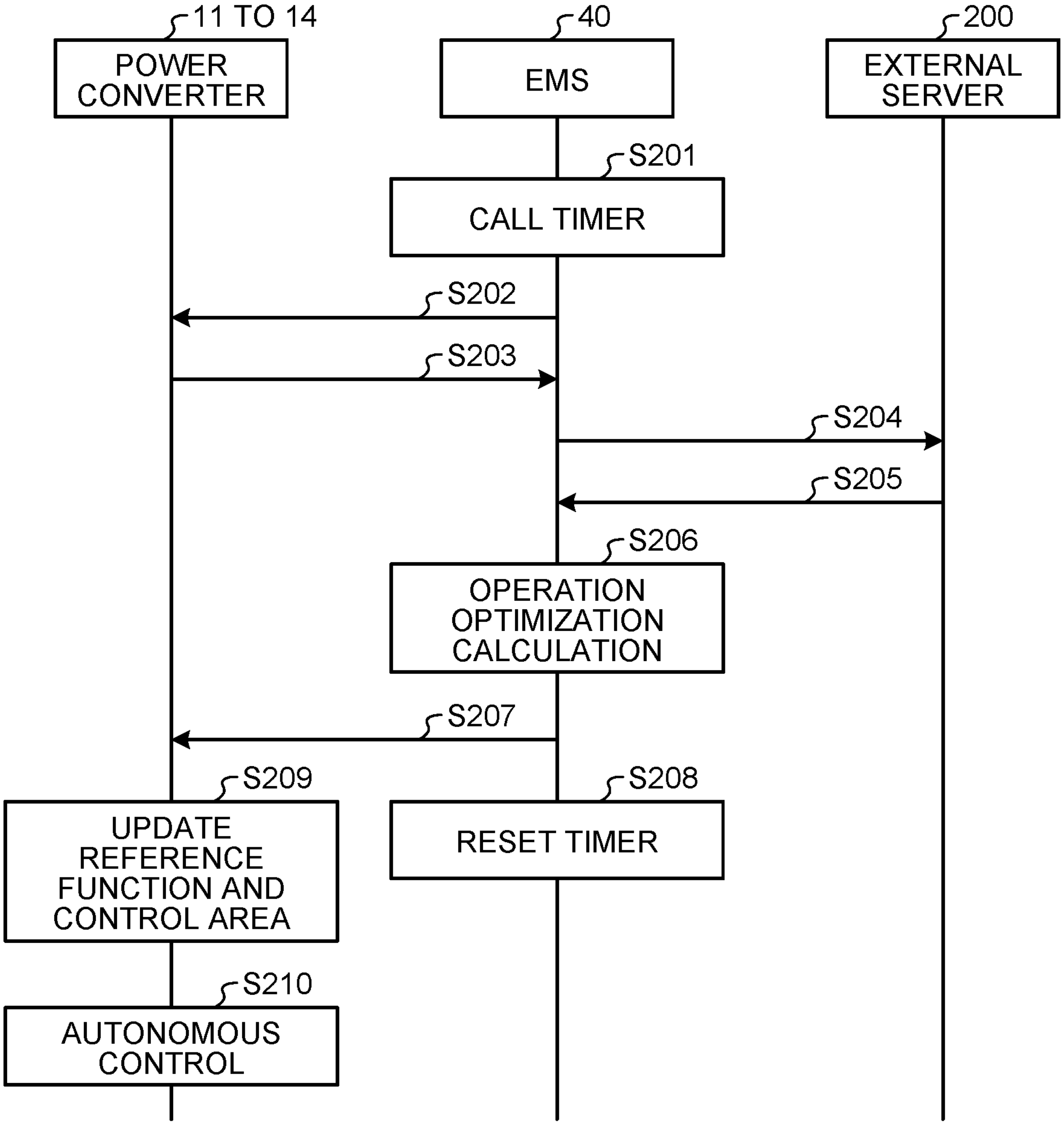
FIG. 8 is a sequence diagram illustrating an example of a control method of the power system.

Next, one example of the control method of the power system 100 as the centralized control will be explained, referring to a sequence diagram in FIG. 8.

First, the EMS 40 calls a timer in its own unit, and start counting (step S201). Subsequently, the EMS 40 requests self-count information respectively to the power converters 11, 12, 13, 14 (step S202). The self-count information is one example of information relating to a power situation of the power system 100, and includes a measurement value measured by respective sensors of the power converters 11, 12, 13, 14, and a measurement time.

Subsequently, the power converters 11, 12, 13, 14 respectively transmit the self-count information to the EMS 40 (step S203). The EMS 40 stores the respective self-count information in the storage unit 42.

Subsequently, the EMS 40 requests various kinds of information that may affect operation of the power system 100 to the external server 200 as an example of information relating to a power situation of the power system 100 (step S204). In this example, the EMS 40 requests power generation amount/demand prediction information to the external server 200. The power generation amount/demand prediction information includes prediction information about a power generation amount and demand predication information of power in the power system 100, and may include, for example, information about season, current weather, future weather forecast, and the like of an area in which the power system 100 is installed. Moreover, when the external server 200 functions as an EMS of another power system, if an operating state of the other power system may affect operation of the power system 100, the power generation amount/demand prediction information may include prediction information of a power generation amount and demand prediction information of power in the other power system.

Subsequently, the external server 200 transmits the power generation amount/demand prediction information to the EMS 40 (step S205). The EMS 40 stores the power generation amount/demand prediction information in the storage unit 42.

Subsequently, the control unit 41 of the EMS 40 retrieves various information transmitted thereto, that is, information relating to a power situation of the power system 100 and the like, from the storage unit 42, and performs operation optimization calculation of the power system 100 based on this (step S206).

The operation optimization calculation is performed is executed to be applicable to various conditions. For example, suppose that the power system 100 is controlled such that the bus 30 operates at the operating point of a predetermined voltage. In this state, suppose that the power generation amount is predicted to increase as the weather is sunny from this point forward in an area in which the power element 22 being a photovoltaic unit is installed based on the power generation amount/demand prediction information, and that the EMS 40 has determined that there is a margin in terms of power supply for the power element 22 from the self-count information acquired from the power converter 12 connected to the power element 22. In this case, the EMS 40 determines that the reference function of the power converter 11 that is connected to the power element 21 is to be updated so that the power element 21, which is a stationary battery storage is charged at the operating point. Furthermore, at the same time as the update, the EMS 40 determines that the reference function of the power converter 14 connected to the power element 24 is to be updated so that the power is not supplied from the power element 24, which is a commercial power system.

Furthermore, the operation optimization calculation may be performed, setting conditions in order to prevent use exceeding a contracted power of the power element 24, which is a commercial power system, such as peak shaving, utilization of night-time power, and the like, or from a perspective of fair electricity rate.

Moreover, the storage unit 42 of the EMS 40 stores trained model, and the EMS 40 may perform the operation optimization calculation by using the trained model. The trained model may be used, for example, as a trained model that has been generated by deep learning using a neural network with information relating to a power situation of the power system 100, and a result of switching and update of the reference functions for the power converters 11, 12, 13, 14 corresponding thereto as training data.

Subsequently, the EMS 40 sets the reference function information and the control area information suitable for a power converter subject to update out of the power converters 11, 12, 13, 14 based on the operation optimization calculation, and outputs an update instruction for the reference function (droop function) and the control area including the set reference function information and the control area information (step S207). Subsequently, the EMS 40 resets the timer (step S208).

Subsequently, the power converter subject to update out of the power converters 11, 12, 13, 14 acquires the update instruction for the reference function and the control area, and performs update of the reference function and the control area (step S209). The power converter that has finished the update of the reference function and the control area performs the autonomous control (step S210).

Modification

An embodiment of the present disclosure has been explained above, but the present disclosure is not to be limited to the embodiment described above, but may be implemented in various other forms. For example, the present disclosure may be implemented by modifying the embodiment described above as follows. The embodiment described above and modifications below may be respectively combined. The present disclosure also includes combinations of the components of each of the embodiments described above and the respective modifications. Further effects and modifications may be easily derived by those skilled in the art. Therefore, the broader scope of the disclosure is not limited to the embodiment described above and the modifications, but various alterations may be applied.

In the embodiment described above, as an electrical characteristic value, such as the measurement value, the target value, and the controlled value, a current value may be used in place of a power value. In this case, for example, the reference function is defined as a V-I characteristic that is a relationship between current (I) and voltage (V). Moreover, for example, a feedback control in which the control unit 11*c* determines a target power Iref (one example of target value) based on a measurement value Vo of voltage obtained by the sensor 11*b* and the reference function information, and an operation amount is set such that a difference between Iref and a measurement value Io (one example of controlled value) of a current obtained by the sensor 11*b* is to be within an acceptable range is also called droop I control, and is performed instead of the droop P control. When the droop I control is performed, the horizontal axis of the control area represents current. Moreover, in the droop I control, a target voltage Vref is determined based on the measurement value Io of current obtained by the sensor 11*b* and the reference function information. The droop I control is one example of current control.

In the embodiment described above, respectively different reference function information and control area information may be stored in the storage unit 11*cd*, and out of the reference function information and the control area information stored therein, reference function information and control area information to be used by the operation-amount setting unit 11*ca* may be switched by an instruction from the EMS 40.

In the respective embodiments described above, the feedback control performed by the respective power converters are not limited to the droop V control or the droop P control based on reference functions, but may be constant voltage control to maintain a constant voltage, or constant power control to maintain a constant power. The constant voltage control being one example of voltage control and the constant power control being one example of power control are examples of control method to control an output of the power converting unit 11*a*.

In the embodiment described above, the control area information is provided for each of plural control areas, and the plural pieces of the control area information are stored in the storage unit 11*cd*, but the determining unit 11*cb* may generate control area information according to a reference function indicated by the reference function information.

The present disclosure is applicable for a power converter, a power system, and a control method of a power converter.

A power converter and a power system of the present disclosure includes a power converting unit that converts input power to output, and a control unit that controls a power conversion characteristic of the power converting unit based on a reference function having a droop characteristic that is defined according to an input value, according to the input value in voltage control, power control, or current control corresponding to the droop characteristic. The reference function is constituted of plural droop functions having droop characteristics different from one another connected at a connection point, a control area to define a range of voltage, power, and current in which corresponding voltage control, power control, or current control is performed is acquired for each of the droop functions, the control area is set, when an operating point determined by the input value fluctuates to deviate from the droop function, such that the operating point is not converged at a position outside a range defined at the connection point in the droop function, and that a fluctuation amount and fluctuation frequency of voltage, power, or current until the operating point is converged on the droop function present after the fluctuation is minimized, a control method of the power conversion characteristic is set based on the control area and the operating point, for voltage control, power control, or current control, and when the operating point moves and changes the control area, the control area is changed according to the droop function corresponding to the control area after the move. Because the control area is set such that the operating point is not converged outside the range of the connection point of the droop function, and the fluctuation amount or fluctuation frequency of voltage, power, or current until it converges on the droop function is minimized, a steady-state deviation does not occur, and because control area is changed according to move of the operating point, settling time may be reduced.

A power converter and a power system of the present disclosure includes a power converting unit that converts input power to output; and a control unit that controls a power conversion characteristic of the power converting unit based on a reference function having a droop characteristic that is defined according to an input value, according to the input value in voltage control, power control, or current control corresponding to the droop characteristic. The reference function is constituted of plural droop functions having droop characteristics different from one another connected, a control area to define a range of voltage, power, or current in which corresponding voltage control, power control, or current control is performed is acquired for each of the droop functions, when an operating point determined by the input value is positioned on a droop function to perform voltage control, for a droop function other than the droop function having the operating point, a neighborhood of the droop function is set as a control area, and for the droop function having the operating point, an area except the control area of the other droop function is set as a control area, when the operating point is positioned on a droop function to perform power control or current control, and the droop function is a droop characteristic of a constant power or a constant current, the control area is set such that a control corresponding to a connected droop function is performed when a voltage of the operating point exceeds a connection point of the droop function, when the operating point is positioned on a droop function to perform power control or current control, and the droop function is not a droop characteristic of a constant power or a constant current, the control area is set such that a control corresponding to a connected droop function is performed when a power of the operating point exceeds a connection point of the droop function, a control method of the power conversion characteristic is set for voltage control, power control, or current control based on the control area and the operating point, and when the operating point moves and changes the control area, the control area is changed according to the droop function corresponding to the control area after the move. Because the control area is set such that the operating point is not converged outside the range of the connection point of the droop function, and the fluctuation amount or fluctuation frequency of voltage, power, or current until it converges on the droop function is minimized, a steady-state deviation does not occur, and because control area is changed according to move of the operating point, settling time may be reduced.

A control method of a power converter of the present disclosure includes a control step of controlling a power conversion characteristic of the power converter based on a reference function having a droop characteristic that is defined according to an input value, in voltage control, power control, or current control corresponding to the droop characteristic. The reference function is constituted of plural droop functions having droop characteristics different from one another connected at a connection point. A step of acquiring a control area to define a range of voltage and power in which corresponding voltage control, power control, or current control is performed for each of plural droop functions; a step of changing, when an operating point determined by the input value moves and changes the control area, the control area according to the droop function corresponding to the control area after the move; a step of setting a control method of the power conversion characteristic based on the control area and the operating point for voltage control, power control, or current control are included. The control area is set, when an operating point determined by the input value fluctuates to deviate from the droop function, such that the operating point is not converged at a position outside a range defined at the connection point in the droop function, and that a fluctuation amount or fluctuation frequency of voltage, power, or current until the operating point is converged on the droop function present after the fluctuation is minimized. Because the control area is set such that the operating point is not converged outside the range of the connection point of the droop function, and the fluctuation amount or fluctuation frequency of voltage, power, or current until it converges on the droop function is minimized, a steady-state deviation does not occur, and because control area is changed according to move A control method of a power converter of the present disclosure includes a control step of controlling a power conversion characteristic of the power converter based on a reference function having a droop characteristic that is defined according to an input value, in voltage control, power control, or current control corresponding to the droop characteristic. The reference function is constituted of plural droop functions having droop characteristics different from one another connected. A step of acquiring a control area to define a range of voltage, power, or current in which corresponding voltage control, power control, or current control is performed for each of plural droop functions; a step of changing, when an operating point determined by the input value moves and changes the control area, the control area according to the droop function corresponding to the control area after the move; a step of setting a control method of the power conversion characteristic based on the control area and the operating point for voltage control, power control, or current control are included. When the operating point is positioned on a droop function to perform voltage control, for a droop function other than the droop function having the operating point, a neighborhood of the droop function is set as a control area, and for the droop function having the operating point, an area except the control area of the other droop function is set as a control area, when the operating point is positioned on a droop function to perform power control or current control, and the droop function is a droop characteristic of a constant power or a constant current, the control area is set such that a control corresponding to a connected droop function is performed when a voltage of the operating point exceeds a connection point of the droop function, when the operating point is positioned on a droop function to perform power control or current control, and the droop function is not a droop characteristic of a constant power or a constant current, the control area is set such that a control corresponding to a connected droop function is performed when a power of the operating point exceeds a connection point of the droop function. Because the control area is set such that the operating point is not converged outside the range of the connection point of the droop function, and the fluctuation amount or fluctuation frequency of voltage, power, or current until it converges on the droop function is minimized, a steady-state deviation does not occur, and because control area is changed according to move of the operating point, settling time may be reduced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power converter comprising:

a power converting unit configured to convert an input power and output a converted power; and a control unit configured to control a power conversion characteristic of the power converting unit based on a reference function having a droop characteristic that is defined according to an input value in any one of voltage control, power control, and current control corresponding to the droop characteristic, wherein the reference function is comprised of a plurality of droop functions having droop characteristics different from one another and connected at a connection point, a control area is acquired for each of the plurality of droop functions to define a range of voltage, power, and current in which corresponding voltage control, power control, or current control is performed, for each of the droop functions, the control area is set, when an operating point determined by the input value fluctuates to deviate from the plurality of droop functions, such that the operating point is not converged at a position outside a range defined by the droop function of the control area in which the operating point is positioned after the fluctuation, and any one of fluctuation amount and fluctuation frequency of voltage, power, or current are minimized until the operating point is converged on the droop function, a control mechanism of the power conversion characteristic is set based on the control area and the operating point, for any one of the voltage control, power control, and current control, and when the operating point moves from a first control area corresponding to a first droop function to a second control area corresponding to a second droop function the control areas for each of the droop functions are changed according to the second droop function.

2. The power converter according to claim 1, further comprising a measuring unit configured to acquire a measurement value of an electrical characteristic value of the input power or converted power, wherein the control unit is configured to control the power conversion characteristic based on a controlled value of the electrical characteristic value based on the measurement value and a target value of the electrical characteristic value based on the reference function.

3. The power converter according to claim 2, wherein the control unit is configured to select a type of the electrical characteristic value of the measurement value, the controlled value, and the target value according to a droop characteristic of the droop function.

4. The power converter according to claim 3, wherein the control unit is configured to select, as the measurement value, any one of a power value and a current value when an absolute value of a droop coefficient of the droop function is smaller than a predetermined value, and select a voltage value when the absolute value of the droop coefficient is equal to or larger than the predetermined value.

5. The power converter according to claim 1, wherein the reference function is switched or updated based on an instruction from outside.

6. The power converter according to claim 4, further comprising a storage unit configured to store the reference function in a switchable or updatable manner.

7. A power converter comprising:

a power converting unit configured to convert an input power and output a converted power; and a control unit configured to control a power conversion characteristic of the power converting unit based on a reference function having a droop characteristic that is defined according to an input value in any one of voltage control, power control, and current control corresponding to the droop characteristic, wherein the reference function is comprised of a plurality of droop functions having droop characteristics different from one another and connected, a control area is acquired for each of the plurality of droop functions to define a range of voltage, power, and current in which corresponding voltage control, power control, or current control is performed, for each of the droop functions, when an operating point determined by the input value is positioned on a droop function to perform voltage control, a control area is defined for each droop function of the plurality of droop functions, the control area being a neighborhood of the droop function for each droop function other than the droop function having the operating point, and the control area for the droop function having the operating point being all area not set as a control area for another droop function of the plurality of droop functions, when the operating point is positioned on a droop function to perform power control or current control, and the droop function is a droop characteristic of a constant power or a constant current, the control area is set such that a control corresponding to a connected droop function is performed when a voltage of the operating point exceeds a connection point of the droop function, when the operating point is positioned on a droop function to perform power control or current control, and the droop function is not a droop characteristic of a constant power or a constant current, the control area is set such that a control corresponding to a connected droop function is performed when a power of the operating point exceeds a connection point of the droop function, a control mechanism of the power conversion characteristic is set for any one of the voltage control, power control, and current control based on the control area and the operating point, and when the operating point moves from a first control area corresponding to a first droop function to a second control area corresponding to a second droop function the control areas for each of the plurality of droop functions are changed according to the second droop function.

8. The power converter according to claim 7, further comprising a measuring unit configured to acquire a measurement value of an electrical characteristic value of the input power or converted power, wherein the control unit is configured to control the power conversion characteristic based on a controlled value of the electrical characteristic value based on the measurement value and a target value of the electrical characteristic value based on the reference function.

9. The power converter according to claim 8, wherein the control unit is configured to select a type of the electrical characteristic value of the measurement value, the controlled value, and the target value according to a droop characteristic of the droop function.

10. The power converter according to claim 9, wherein the control unit is configured to select, as the measurement value, any one of a power value and a current value when an absolute value of a droop coefficient of the droop function is smaller than a predetermined value, and select a voltage value when the absolute value of the droop coefficient is equal to or larger than the predetermined value.

11. The power converter according to claim 7, wherein the reference function is switched or updated based on an instruction from outside.

12. The power converter according to claim 10, further comprising a storage unit configured to store the reference function in a switchable or updatable manner.

13. A control method of a power converter, comprising:

a control step of controlling a power conversion characteristic of the power converter based on a reference function having a droop characteristic that is defined according to an input value, in any one of voltage control, power control, and current control corresponding to the droop characteristic, wherein the reference function is constituted of a plurality of droop functions having droop characteristics different from one another and connected at a connection point, and comprising:

a step of acquiring a control area to define a range of voltage and power in which corresponding voltage control, power control, or current control is performed for each of a plurality of droop functions;

a step of changing, when an operating point determined by the input value moves from a first control area corresponding to a first droop function to a second control area corresponding to a second droop function the control areas for each of the plurality of droop functions according to the second droop function;

a step of setting a control method of the power conversion characteristic based on the control area and the operating point for any one of voltage control, power control, and current control, wherein the control area is set, when an operating point determined by the input value fluctuates to deviate from the plurality of droop functions, such that the operating point is not converged at a position outside a range defined at the connection point in the droop function, and any one of fluctuation amount and fluctuation frequency of voltage, power, or current are minimized until the operating point is converged on the droop function.

14. A control method of a power converter, comprising:

a control step of controlling a power conversion characteristic of the power converter based on a reference function having a droop characteristic that is defined according to an input value, in any one of voltage control, power control, and current control corresponding to the droop characteristic, wherein the reference function is comprised of a plurality of droop functions having droop characteristics different from one another and connected, a step of setting a control mechanism of the power conversion characteristic based on a control area of a droop function of the plurality of droop functions and an operating point for any one of voltage control, power control, and current control;

a step of changing, when an operating point determined by the input value moves from a first control area corresponding to a first droop function to a second control area corresponding to a second droop function the control areas for each of the plurality of droop functions according to the second droop function; and a step of setting a control method of the power conversion characteristic based on the control area and the operating point for any one of voltage control, power control, and current control, when the operating point is positioned on a droop function to perform voltage control, a control area is defined for each function of the plurality of droop functions, the control area being a neighborhood of the droop function for each droop function of the plurality of droop functions other than the droop function having the operating point, and the control area for the droop function having the operating point being all area not set as a control area for another droop function of the plurality of droop functions, when the operating point is positioned on a droop function to perform power control or current control, and the droop function is a droop characteristic of a constant power or a constant current, the control area is set such that a control corresponding to a connected droop function is performed when a voltage of the operating point exceeds a connection point of the droop function, when the operating point is positioned on a droop function to perform power control or current control, and the droop function is not a droop characteristic of a constant power or a constant current, the control area is set such that a control corresponding to a connected droop function is performed when a power of the operating point exceeds a connection point of the droop function.

* * * * *